(12) United States Patent
Obermeier

(10) Patent No.: US 6,571,890 B2
(45) Date of Patent: Jun. 3, 2003

(54) TWIST DRILL

(75) Inventor: Josef Obermeier, Peiting (DE)

(73) Assignee: Hilti Aktiengesellschaft, Schaan (LI)

( * ) Notice: Subject to any disclaimer, the term of this patent is extended or adjusted under 35 U.S.C. 154(b) by 34 days.

(21) Appl. No.: 09/814,238

(22) Filed: Mar. 21, 2001

(65) Prior Publication Data

US 2001/0023783 A1 Sep. 27, 2001

(30) Foreign Application Priority Data

Mar. 27, 2000 (DE) .......................... 100 15 203

(51) Int. Cl.⁷ .................................. E21B 10/44
(52) U.S. Cl. ....................... 175/394; 175/414
(58) Field of Search ................. 175/394, 395, 175/310, 323, 102, 414; 299/87; 408/230

(56) References Cited

U.S. PATENT DOCUMENTS

| | | | |
|---|---|---|---|
| 4,579,180 A | * | 4/1986 | Peetz et al. .................. 175/394 |
| 5,160,232 A | | 11/1992 | Maier |
| 5,456,328 A | * | 10/1995 | Saxman ...................... 175/376 |
| 5,531,553 A | * | 7/1996 | Bickford ..................... 411/389 |
| 5,873,683 A | | 2/1999 | Krenzer |
| 6,290,002 B1 | * | 9/2001 | Comeau et al. ............... 175/73 |

FOREIGN PATENT DOCUMENTS

| | | | |
|---|---|---|---|
| DE | 3315661 A1 | * | 4/1984 |
| DE | 3826239 | | 2/1990 |
| DE | 29724063 | | 11/1999 |
| EP | 0352215 | | 1/1990 |
| GB | 183005 | | 7/1922 |
| SU | 891220 | | 12/1981 |

* cited by examiner

Primary Examiner—Frank S. Tsay
(74) Attorney, Agent, or Firm—Sidley Austin Brown & Wood, LLP

(57) ABSTRACT

A twist drill (1) has a plurality of of protuberances (9) arranged in the grooves (6) of the helix (4) which project radially outward partially into the groove cross section to prevent clumps.

9 Claims, 1 Drawing Sheet

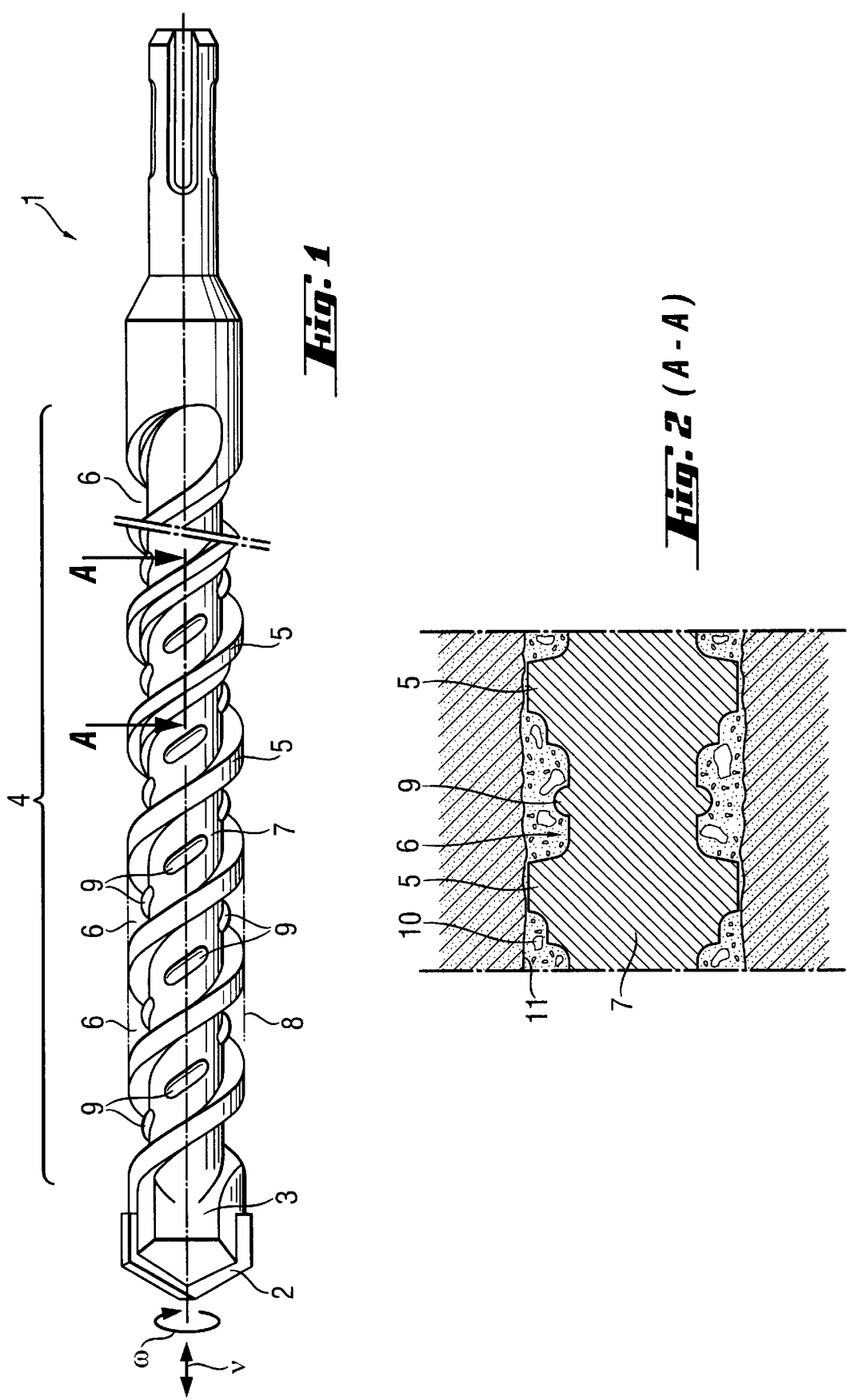

TWIST DRILL

BACKGROUND OF THE INVENTION

The invention is directed to a twist drill which is inserted into a rotating, and optionally percussive, tool and is advantageously used for abrasive removal of rock or rock-like material, such as concrete.

Twist drills with a helix formed helically on a drill core for carrying off the abrasively removed drilled material through rotation of the twist drill are common. The helix usually has a plurality of helical turns with associated flutes or grooves along which the drilled material abrasively removed by the drill head is carried away.

Twist drills of this kind are known, for example, from EP0653544B1 which discloses two identical helix turns which extend at a constant pitch adjoining one of the two cutting edges of the drill head. Further, at the radial outer edge of the helical turns, whose envelope forms a cylinder of roughly the diameter of the drill during rotation, this twist drill has a stair-shaped toothing acting in a radially cutting manner. In order to achieve the largest possible groove cross section, the groove is constructed angularly to the axis of drill core.

In small-diameter drill tools and powerful tool equipment, the abrasively removed drilled material often forms clumps and leads to a clogging of the groove until the drill tool finally jams or the clogging material is suddenly released. This is prevented in EP 339412A2 in that the pitch changes along the helix and the helix turns have additional step-like side surfaces which engage in the groove. Aided by the percussive loading of the drill tool, the predominantly axially and otherwise oriented surface regions lead to an alternating acceleration of the material which is carried away and, therefore, results in a whirling motion within the groove which inhibits clumping. A disadvantage in such a construction of the side surfaces of the helix turns consists in the toothing of the rotating helical turns which accordingly results near the envelope and which can lead to a high risk of injury in the open area of the helix and to an unintentional cutting out of the bore hole in the area located in the bore hole. In addition, manufacture of a contour of this kind at the side surfaces of the helix turns causes disadvantages because this contour would have to be specially produced by stamping.

DE3919095A1 discloses a twist drill for rock which has radially oriented brush inserts anchored in the shank for cleaning the bore hole. The brush inserts form a kind of discontinuous helical thread in their arrangement relative to one another or are arranged in the base of the groove formed by a helix turn. For reasons relating to their function, these brush inserts extend radially continuously to the envelope formed by rotation. A disadvantage in filigreed brush inserts of different material is their short service life precisely during rough use in the construction trade. Further, because of their radial extension up to the envelope, the brush inserts arranged inside the groove substantially reduce the groove cross section actually available for carrying away drilled material.

SUMMARY OF THE INVENTION

It is the primary object of the invention to provide a twist drill which has a long life, can be used without danger and prevents clumping of the drilled material in the groove and in which the above-mentioned disadvantages are avoided.

Essentially, individual radially extending protuberances are formed in and arranged along the groove formed by the helical land and penetrate partially into the groove cross section without reaching the envelope. By means of the longitudinal shock waves occurring when the drill tool is acted upon percussively, the abrasively removed drilled material which is carried away via the groove is alternately accelerated by the axially oriented surface regions of the protuberances projecting into the groove cross section, which results in a whirling of the dust-like drilled material so as to prevent clumping. Clumps that have already formed are extensively accelerated in alternating twisting motion and, due to their mass inertia, are accordingly broken apart.

An offset arrangement and different sizes or spacing of the protuberances interact with clumps of various sizes in different areas of the groove.

When the twist drill is rotating during use, the protuberances formed along the base of the groove are geometrically protected from unintentional contact by the helix turns which surround them on both sides and which are smooth on the radial outer side, so that a cutting action at the edge of the bore hole or a risk to the user is ruled out.

The only partial radial extension of the protuberances reduces the groove cross section available for material removal only unsubstantially.

The protuberances which are advantageously made of the same material as the drill core of the twist drill are compact and in no way impair the life of the drill tool.

The invention is explained more fully in the following with reference to an exemplary embodiment.

BRIEF DESCRIPTION OF THE DRAWINGS

FIG. 1 shows a twist drill;

FIG. 2 shows a section from FIG. 1.

DETAILED DESCRIPTION OF THE INVENTION

According to FIG. 1 and the axial section A—A shown in FIG. 2, a twist drill 1 with a drill head 3 outfitted with cutters 2 has an axially extending helix 4 which adjoins the drill head 3 and has at least one helical turn or land 5 between which is formed a groove 6 extending outwardly from a drill core 7. The radial outer surface of the helical turn or land 5 describes a cylindrical envelope 8 about the axis of rotation during rotation.ω The radial outer surface of the land 5 is slightly inward of the radial outer surface of the cutters 2 so that the envelope 8 is inward of the bore hole surface formed by the cutters 2. A plurality of individual protuberances 9 which preferably extend centrally along the groove 6 and project into the groove 6 between the lands 5 radially outward without reaching the envelope 8 are arranged at the base of the groove 6 defining the drill core 7. These individual protuberances 9 are preferably formed in a prismatically compact manner with a radial height of $\frac{1}{10}$ to $\frac{1}{2}$, preferably $\frac{1}{4}$, of the groove depth, with a width of $\frac{1}{10}$ to $\frac{1}{2}$, preferably $\frac{1}{4}$, of the groove width oriented transverse to the helical land 5, and with a length, oriented longitudinal to the helix land 5, of $\frac{1}{10}$ to twice the groove width, preferably equal to the whole of the groove width, wherein the individual protuberances 9 are spaced relative to one another essentially along the groove 6 at a distance of $\frac{1}{10}$ to four-times the groove width, advantageously equal to the length, along a central line or at an offset thereto and preferably have the same size. With their essentially axially oriented longitudinal surfaces, the individual protuberances 9 cause an acceleration, through the axial collision rate or oscillation v, of abrasively removed drilled material 10 carried away inside the groove 6 by the helix 6 and therefore prevent a clogging of the twist drill 1 in a bore hole 11 due to clumping.

What is claimed is:

1. Twist drill for working in rock and similar hard materials comprising an axially extending drill core (7), at least one helical land (5) winding around and projecting radially outwardly from said drill core (7), at least one helical groove (6) formed between turns of said helical land (5) and said drill core (7) forming a radial inner base of said groove (6), a plurality of protuberances located in and extending along the helical direction of said groove (6), and said protuberances are formed of the same material as said drill core (7).

2. Twist drill, for working in rock and similar hard materials comprising an axially extending drill core (7), at least one helical land (5) winding around and projecting radially outwardly from said drill core (7), at least one helical groove (6) formed between turns of said helical land (5) and said drill core (7) forming a radial inner base of said groove (6), a plurality of protuberances located in and extending along the helical direction of said groove (6), and said protuberances are formed of the same material as said drill core (7), said land (5) has a radially outer surface spaced from the base of said groove and forming an axially extending cylindrical envelope (8) as said twist drill (1) rotates, and said protuberances (9) spaced radially inwardly from the envelope (8).

3. Twist drill, as set forth in claim 2, wherein said protuberances are formed outwardly from the base of said groove (6).

4. Twist drill, as set forth in claim 1, wherein said protuberances (9) are formed in a prismatically compact manner.

5. Twist drill, as set forth in claim 3, wherein said protuberances all have the same size.

6. Twist drill, as set forth in claim 3, wherein said groove (6) has a depth inwardly of the envelope (8) to the base of the groove, a width extending transversely of the helical turns of said land (5), and said protuberances (9) have a radial height from the base of said groove (6) of approximately ¼ of the groove depth, a width of approximately ¼ of the groove width and a length of approximately the width of the groove.

7. Twist drill, as set forth in claim 6 wherein adjacent said protuberances are spaced apart by approximately the length of said protuberances.

8. Twist drill, as set forth in claim 1, wherein said protuberances (9) are arranged along a line in said groove (6) centered between adjacent said turns of said land.

9. Twist drill, as set forth in claim 1, wherein said protuberances (9) are arranged along a line in said groove (6) offset from a line centered between adjacent said turns of said land.

* * * * *